United States Patent [19]

Araujo et al.

[11] 4,405,672
[45] Sep. 20, 1983

[54] COMPOSITE PHOTOCHROMIC GLASS ARTICLE AND METHOD OF MAKING

[75] Inventors: Roger J. Araujo, Horseheads; Nicholas F. Borrelli, Elmira; Paul A. Tick; Donald M. Trotter, both of Corning, all of N.Y.

[73] Assignee: Corning Glass Works, Corning, N.Y.

[21] Appl. No.: 358,351

[22] Filed: Mar. 15, 1982

[51] Int. Cl.³ .......................... B32B 1/04; B32B 17/06
[52] U.S. Cl. ..................................... 428/68; 65/30.11; 65/30.13; 428/210; 428/410; 428/426; 428/428; 428/427; 428/913; 428/332; 501/13
[58] Field of Search .......... 428/68, 210, 410, 426–428, 428/688, 913, 332; 65/30.11, 30.13; 501/13

[56] References Cited

U.S. PATENT DOCUMENTS

| | | | |
|---|---|---|---|
| 3,325,299 | 6/1967 | Araujo et al. | 65/30.11 |
| 3,328,182 | 6/1967 | Araujo et al. | 65/30.11 |
| 3,615,771 | 10/1971 | Meiling | 65/30.11 |
| 4,035,527 | 7/1977 | Deeg | 65/30.11 |
| 4,076,542 | 2/1978 | Deeg | 65/30.11 |
| 4,076,544 | 2/1978 | Kerk et al. | 501/13 |
| 4,166,745 | 9/1979 | Araujo et al. | 65/30.11 |
| 4,297,417 | 10/1981 | Wu | 428/410 |

FOREIGN PATENT DOCUMENTS 3032580 3/1982 Fed. Rep. of Germany ...... 428/410

Primary Examiner—George F. Lesmes
Assistant Examiner—E. Rollins Buffalow
Attorney, Agent, or Firm—C. S. Janes, Jr.; M. M. Peterson

[57] ABSTRACT

There is disclosed a composite photochromic glass article composed of a glass core and a thin surface layer substantially encasing that core, the core preferably containing a copper-cadmium halide photochromic crystal system and the substantially encasing glass layer preferably containing a copper-cadmium-silver halide photochromic crystal system. The article may be made by fusion laminating two separately formed glasses, or by introducing silver into a surface layer on a glass article by ion exchange.

12 Claims, 4 Drawing Figures

COMPOSITE PHOTOCHROMIC GLASS ARTICLE AND METHOD OF MAKING

BACKGROUND OF THE INVENTION

U.S. Pat. No. 3,208,860 (Armistead et al.) provides a general discussion of the theoretical concepts underlying the phenomenon of photochromism in glass (formerly termed phototropism). It also outlines the practical considerations which must be observed in producing such glass. As illustrative of the phenomenon, the patent provides exemplary compositions of inorganic silicate glasses which contain submicroscopic crystals of at least one of the silver halides, viz., silver chloride, silver bromide, or silver iodide. When subjected to actinic radiation, customarily ultraviolet radiation, the crystals become darker in color, thereby decreasing the optical transmission of the glass. However, when the actinic radiation is removed, the crystals return to their original state and the optical transmission of the glass is restored.

It is postulated that the actinic radiation reacts on the crystals dispersed within the glassy matrix to alter the absorptive characteristics of the crystals to visible light. Unlike the normal photographic film, glass is inert and impermeable. Therefore, when the impingement of actinic radiation on the glass is halted, the crystals are permitted to return to their original state, since the reaction products resulting from the exposure of the crystals to actinic radiation cannot diffuse away from the site of the reaction. This circumstance allows the transmission of such glass to visible light to be reversibly varied ad infinitum.

U.S. Pat. No. 3,325,299 (Araugjo) discloses the production of photochromic glass from inorganic glass compositions comprising copper, cadmium, and a halogen selected from the group consisting of chlorine, bromine, and iodine as essential components. The photochromically-active constituent of these glasses is a copper-cadmium halide phase which darkens on exposure to 300–550 nm. radiation and fades in the absence thereof.

Glasses of the type described in U.S. Pat. No. 3,325,299 offer certain advantages over photochromic glasses of the silver halide type, principally with respect to batch cost and photochromic behavior. The darkening of these glasses is more proportional to the intensity of incident light, and less dependent upon temperature, than is the case with silver halide glasses. Also, these glasses tend to absorb actinic radiation strongly. Hence they darken only in a relatively thin surface layer of the exposed glass, and exhibit high darkened optical density even in thin cross-section.

Unfortunately, photochromic glasses of the copper-cadmium halide type also suffer certain disadvantages, especially with respect to the color of the glass. Thus, these glasses in general exhibit only greenish coloration in the darkened state.

U.S. Pat. No. 4,076,544 (Kerko et al.) discloses photochromic glasses similar to those disclosed in U.S. Pat. No. 3,325,299, but containing a photochromic phase which includes copper, cadmium, silver and at least one halogen selected from the group consisting of chlorine, bromine and iodine. These glasses are susceptible to optical bleaching and retain rapid thermal fading and surface darkening characteristics. However, when darkened, they tend to produce purple to reddish-brown colors.

The darkened color of a photochromic glass may not be of particular significance in apparatus components, such as display panels or memory devices. The situation is quite different in ophthalmic use for example. Here, a neutral or inconspicuous color may be greatly preferred. Hence, neither the green colors provided by the copper-cadmium halide phase of U.S. Pat. No. 3,325,299, nor the purple or reddish brown colors provided by the silver-copper-cadmium phase of U.S. Pat. No. 4,076,544, are considered desirable for such purpose.

PURPOSE OF THE INVENTION

A basic purpose is to provide a photochromic glass article that has improved color characteristics for ophthalmic applications when darkened. A further purpose is to accomplish this without sacrifice of other desirable characteristics. A particular purpose is to obtain such improved color in conjunction with the photochromic fading and darkening rates and thermal independence that characterize glasses with a copper-cadmium-halide phase. Another purpose is to minimize the material cost, in particular the use of expensive silver. A further purpose is to provide unique means for producing photochromic glass articles having such improved characteristics.

SUMMARY OF THE INVENTION

To these purposes, and others which will become apparent, the present invention resides in part in a composite photochromic glass article comprising a core portion and a thin surface layer substantially encasing that core portion, one of said core portion and said encasing layer being composed of a first glass containing a copper-cadmium halide photochromic phase in a surface layer thereof, and the other of said component parts being composed of a second glass that has a copper-cadmium-silver halide photochromic phase developed therein, the depth of photochromic development in the article being not over about ten mils and exhibiting in the darkened state, a color intermediate the characteristic red and green of the component glasses. Preferably, the core portion is composed of the glass containing a copper-cadmium halide photochromic phase, and the encasing layer is composed of the glass having a copper-cadmium-silver halide photochromic phase developed therein.

The invention further resides in a method of producing such composite photochromic glass article which comprises forming a core portion from a selected glass, the selected glass being one capable of having a copper-cadmium-halide photochromic phase developed therein, or one capable of having a copper-cadmium-silver-halide photochromic phase developed within its mass, and substantially encasing this core portion within a thin layer of the glass not selected for the core. The article may be formed by producing separate glass bodies of different composition and bringing these bodies together to form a laminated glass article, preferably fused together to form an integral body. Alternatively, a single glass body of uniform composition may be formed, and the encasing thin layer developed thereon by exchanging alkali metal ions from the glass with silver ions from an external source.

PRIOR LITERATURE

The above-discussed Araujo and Kerko et al. patents disclose, in single glass bodies, the photochromic glasses employed in the composite article of the present invention. Accordingly, these patents are incorporated herein in their entirety by reference.

In addition, several other United States patents, hereafter mentioned, may be considered of interest.

Laminated glass articles, as such, are well known in the glass art. For example, U.S. Pat. No. 3,673,049 (Giffen et al.) describes producing such articles by means of a continuous, hot-forming process wherein individual glass layers are brought together as they emanate from their respective glass melts, and the layers are simultaneously fused together and shaped into a laminated structure.

U.S. Pat. No. 4,130,680 (Ference et al.) discloses a composite or laminated glass article having an opal glass core, and an integrally colored, photosensitive glass layer encasing the core. U.S. Pat. No. 4,149,896 (Faulstich et al.) discloses a multifocal photochromic glass lens wherein the glass segment, and the blank into which it is sealed, may both be photochromic glasses.

U.S. Pat. No. 3,691,045, No. 3,875,321 and No. 4,035,527 disclose forming photochromic films or coatings on glass or plastic substrates.

U.S. Pat. No. 3,328,182, No. 3,954,485, and No. 4,166,745 disclose single glass photochromic articles which either contain a copper-cadmium-halide phase or contain cadmium as a dopant.

Numerous patents disclose the exchange of silver ions for alkali metal ions, within a glass surface, to produce color for decorative purposes. Among the earliest patents recognizing the nature of the exchange are U.S. Pat. No. 2,075,446 and No. 2,198,733. U.S. Pat. No. 2,732,298 transfers a photographic image into a glass surface by such exchange.

U.S. Pat. No. 3,419,370 (Cramer et al.) and No. 3,656,923 (Garfinkel et al.) describe exchanging silver ions into a surface layer on a nonphotochromic glass to render that surface layer photochromic after heat treatment.

GENERAL DESCRIPTION

Heretofore, photochromic glass articles have generally been formed from a single glass as an integral body. In contrast, a characteristic feature of the present invention is a combination of two photochromic glasses into a composite article wherein a thin layer of one glass encompasses a core of the second glass.

Figure 1:
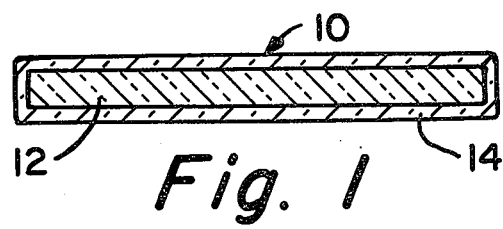
FIG. 1 is a cross-section of a composite glass sheet in accordance with the invention.

FIG. 1 illustrates, in a simple plate or sheet form, an article in accordance with the invention. Thus, a glass sheet, generally designated by the numeral 10, consists of a core portion 12 and an encasing skin layer 14.

As shown, core 12 is a flat sheet or strip of glass. However, it may take any desired form which can be molded or shaped by available means. In particular, a sagged or molded concavo-convex shape, such as is used for ophthalmic lenses, is contemplated. A flat sheet, as shown, may, for example, be employed in a screen or display panel.

In the preferred embodiment of the invention, it is contemplated that core 12 will be composed of a glass having a copper-cadmium-halide photochromic phase developed therein, or that is capable of having such phase developed by heat treatment. The earlier-mentioned Araujo patent, No. 3,325,299, discloses a family of compositions useful for core 12, the production of photochromic glasses therefrom, and their characteristics. Accordingly, reference is made to such patent which is incorporated, in its entirety, herein by reference. It will be appreciated that any glass disclosed in the prior patent may be used herein.

Briefly, glasses described in the patent as being capable of having a copper-cadmium-halide phase thermally developed are composed of 40–76% $SiO_2$, 4–26% $Al_2O_3$, 4–26% $B_2O_3$, and at least one alkali metal oxide in the indicated proportions of 2–8% $Li_2O$, 4–15% $Na_2O$, 6–20% $K_2O$, 8–25% $Rb_2O$ and 10–30% $Cs_2O$, 0.3–10% of copper and/or cadmium, and sufficient halogen, selected from the group chlorine, bromine and iodine, to react stoichiometrically with at least 0.3% total of said copper and/or cadmium. A glass of such composition is rendered photochromic by heat treatment above the glass strain point, but below about 950° C., to precipitate submicroscopic crystals of radiation-sensitive copper or cadmium halide.

Encasing glass layer 14 then may be a glass of the family disclosed in the earlier-mentioned Kerko et al. patent, No. 4,076,544. These are glasses capable of having a copper-cadmium-silver-halide photochromic phase developed therein by thermal treatment. They are disclosed as having compositions consisting essentially of the $SiO_2$-$Al_2O_3$-$B_2O_3$-$R_2O$ base glasses of Araujo that further contain at least about 0.01% Ag, 0.03% CuO, 0.4% CdO, and 0.3% total halogen selected from chlorine, bromine and iodine. The photochromic phase may be developed, if necessary, by heating the glass to a temperature between its strain and annealing temperatures. Again, the patent teaching is incorporated in its entirety, and reference is made thereto for further information.

It will be appreciated that, subject to thickness limitations as hereafter described, the present invention is technically operative regardless of which photochromic glass is selected as the core, providing its counterpart is selected for the encasing layer. However, there are at least two significant reasons for preferring that the encasing layer, necessarily thin, be the glass having a copper-cadmium-silver halide phase. First, since this layer is necessarily thin, the amount of expensive silver employed is minimized. Second, as explained later, a simple ion exchange may be employed to produce the article.

Core 12 and outer layer 14 may be fusion laminated in any known manner. One simple procedure for a sheet or plate structure, as shown, is separate formation of suitable flat glass sheets or strips. This may be followed by grinding and polishing of the mating surfaces to provide essentially perfect fit and elimination of interface defects. The layered stack is then thermally softened, and, if necessary, pressure is applied to provide a fused, integral body.

Alternatively, a laminated glass body may be made in accordance with the continuous hot-forming process described in U.S. Pat. No. 3,673,049. In the process of that patent, the different glasses may, for example, be delivered from their respective melting units in the form of soft glass sheets and brought together to form, by fusion on contact, an integral laminated sheet. This structure may then be cooled, or may be subjected to further ware forming steps while in the heat softened state.

As noted earlier, both the copper-cadmium-halide type glasses of Araujo, and the Kerko et al. glasses additionally containing silver, are surface darkeners. This means that the glasses strongly absorb the actinic radiation that activates their photochromic phases. In turn, that means that, while a high optical density is attained in a thin layer, the actinic radiation is effective in only a thin layer.

The significance of the foregoing is that the total depth of photochromic development will not exceed ten mils (0.250 mm) and may be on the order of five mils (0.125 mm). Consequently, the encasing surface layer or skin 14 will normally not be over five mils (0.125 mm) thick, and preferably is one to three mils thick (0.025–0.075 mm). It is readily apparent then that the amount of silver required in a laminated glass body is much smaller than in a body composed of one glass containing silver in its composition.

It has also been found that the preferred encased construction may be achieved by ion exchanging silver ions into the surface of a glass containing copper, cadmium, and halide, as disclosed in the Araujo patent. Thus, the introduction of silver by ion exchange provides, in a thin surface layer, the silver necessary for production of a copper-cadmium-silver-halide phase, rather than a copper-cadmium-halide phase, when the article is heat treated. The ion exchanged layer then tends to behave as a silver-containing glass such as disclosed in the Kerko et al. patent. That is, the layer exhibits good darkening, a favorable fading rate, and an increasing color shift away from green toward a red or reddish purple.

It will be appreciated that, whether the laminated or encased structure is formed directly from the melt, or by ion exchange, or by fusion of preformed elements, the thermal treatment for both glasses will be applied subsequently. Temperatures and times for such treatment will be based on principles discussed thoroughly in the Araujo and Kerko et al. patents.

The present invention is based on the principle of color balance. It takes advantage of the discovery that the respective photochromic color responses, which occur upon darkening of a glass with a copper-cadmium-halide phase (green) and a glass with a copper-cadmium-silver-halide phase (reddish purple), are retained in a fused composite. Hence, these responses tend to essentially cancel or balance each other and provide a neutral appearance.

Figure 2:
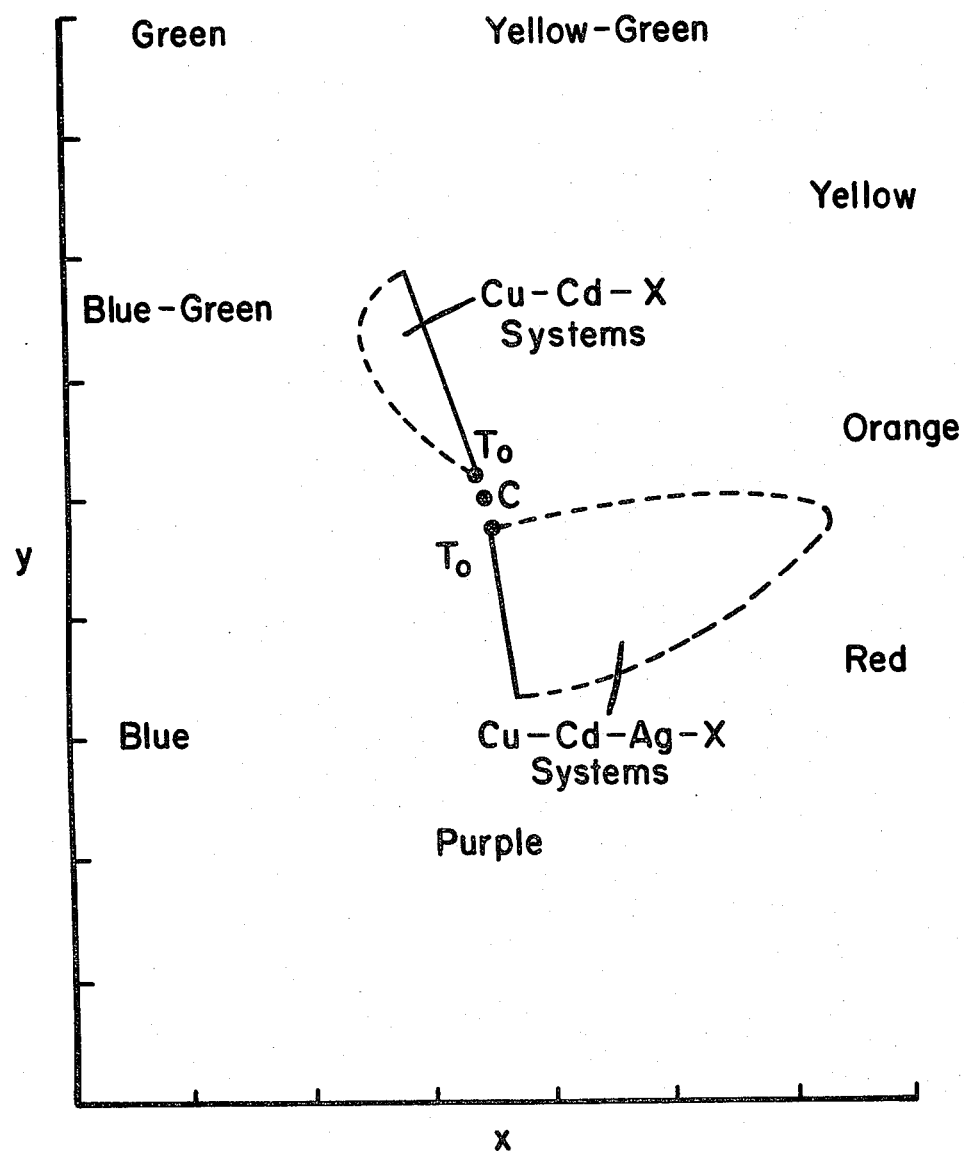
FIG. 2 is a general graphical representation of color relationships in terms of color coordinates.

The principles involved may be more clearly seen by reference to FIG. 2, a schematic graphical representation of the color relationships that generally exist between the prior glasses. This FIGURE is presented in terms of x and y color coordinate values, although no actual values are assigned in the graph. Rather, the several colors of the spectrum are arranged in essentially radial relation to an arbitrary center C. Thus, as a glass darkens, any given color will predominate as the color coordinate junction moves away from C towards that color.

In the actual showing, a darkening and fading color change, typical of each photochromic glass type, is schematically plotted. In each curvilinearly defined path, the solid line represents color change as the glass darkens, and the dotted line represents color change as the darkened glass fades. The heavy dot indicates the starting point (To) in each case.

As indicated by labeling, the upper pattern illustrates typical behavior in the system of glasses having a photochromic copper-cadmium-halide phase, as disclosed by Araujo. Thus, as the glass is exposed to activating ultraviolet radiation, the color becomes a pronounced green, (as shown by the arrow), and then reverses as the glass fades when the activating exposure is removed.

The lower pattern is for glasses having a copper-cadmium-silver-halide phase (typical of the Kerko et al glasses). Here, the color becomes more intensely purple as the glass darkens under radiation, and then loses this color, albeit in a circuitous path, as the glass fades.

It becomes apparent that, if the two glasses were correspondingly affected by radiation while overlaid, they should tend to balance each other and produce a relatively neutral dark effect.

In actual practice, as is shown below, the glasses appear to react at somewhat different rates, thus leading to S-type curves as one photochromic phase, and then the other, predominates. Nevertheless, there is a consistent tendency to balance color, a fact that becomes more apparent with longer times of exposure.

SPECIFIC EMBODIMENTS

Figure 3:
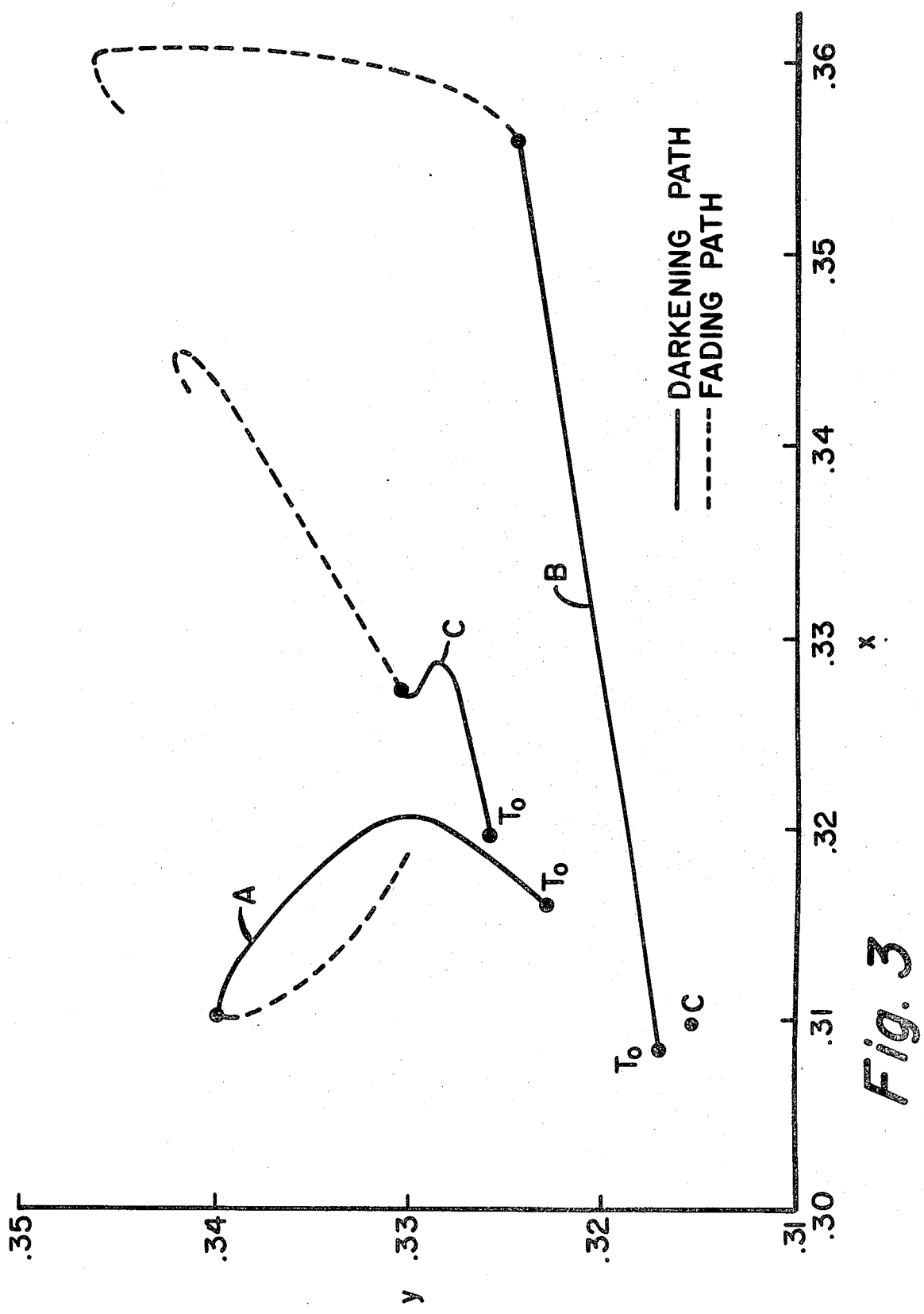
FIGS. 3 and 4 are specific graphical representations, in terms of color coordinates, comparing composite articles of the present invention with prior single glass articles.
Figure 4:
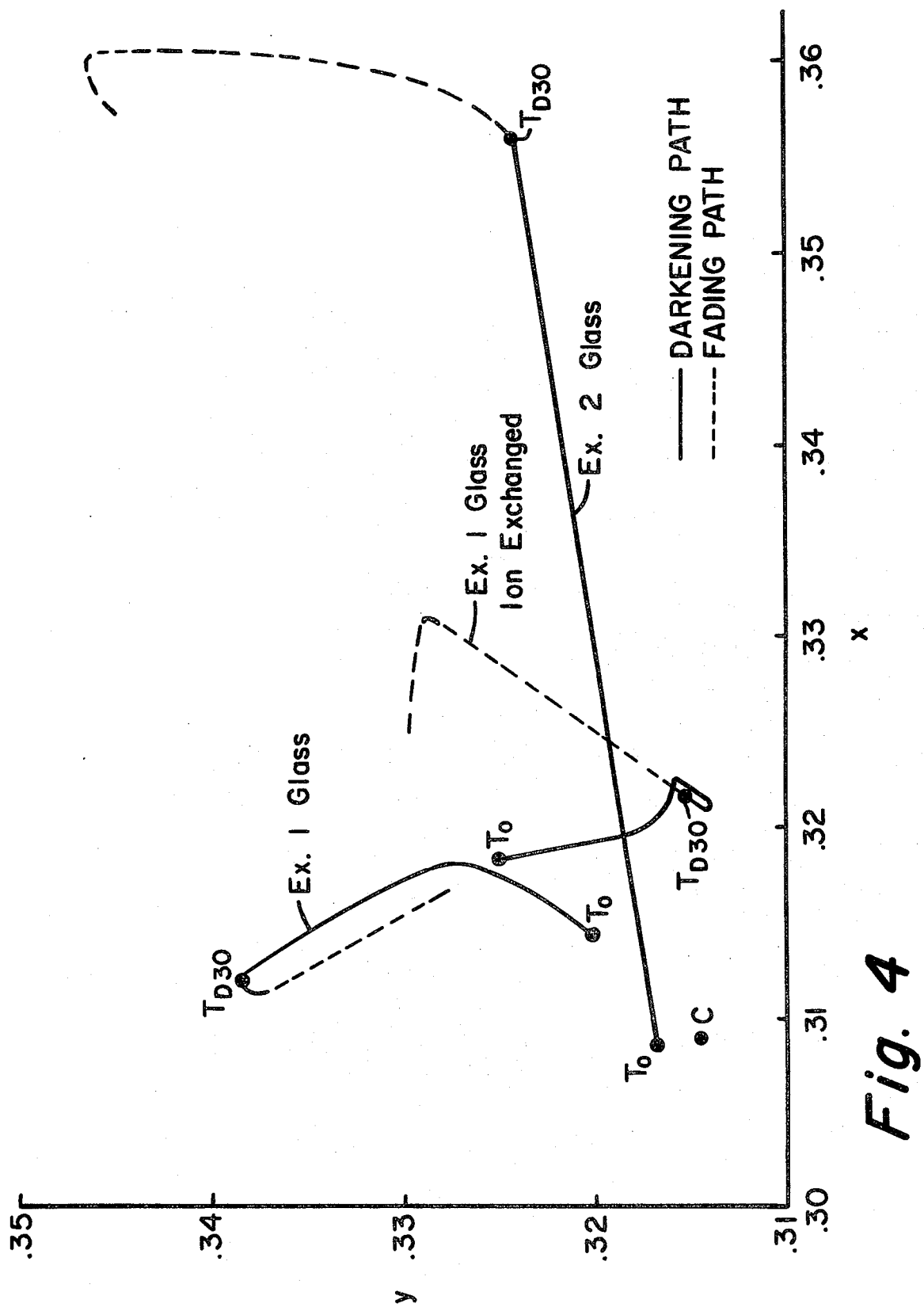

The principle of color balancing is further illustrated in FIGS. 3 and 4 with respect to measurements made on actual glasses. Each FIGURE is a graphical representation of color coordinate values. The X-coordinate values are plotted along the horizontal axis, and y- values along the vertical axis. As in FIG. 2, the solid line, starting at $T_o$ and ending at $T_D$, represents color change as a glass darkens under radiation exposure. The dotted line represents color change as the glass fades after the activating radiation is removed. Essentially neutral color is represented by "C". It is apparent that the glasses have not completely faded in the time allotted.

Glass melts were made from batches formulated on the basis of teachings in the prior reference patents. Table I shows the glass compositions as calculated from the batch in parts by weight approximating weight percent, except that the halides are in excess. Example 1 is a glass of the family disclosed by the Araujo patent, while Example 2 is a glass of the family disclosed in the Kerko et al. patent.

TABLE I

|                    | 1    | 2     |
|--------------------|------|-------|
| SiO$_2$            | 56.0 | 52.3  |
| B$_2$O$_3$         | 9.4  | 20.5  |
| Al$_2$O$_3$        | 22.8 | 10.7  |
| Na$_2$O            | 9.2  | 2.4   |
| Li$_2$O            | —    | 2.3   |
| CdO                | 2.3  | 2.0   |
| MgO                | —    | 5.8   |
| BaO                | —    | 3.5   |
| Cu$_2$O            | 0.20 | 0.36  |
| Ag                 | —    | 0.013 |
| SnO                | 0.38 | 0.09  |
| Cl                 | 2.9  | 1.07  |
| F                  | 1.4  | 1.72  |

Batches were compounded from conventional glass-making materials on the basis of the compositions in TABLE 1. The batches were heated at 1200°–1500° C. to provide optically clear melts. These were poured into molds and/or rolled to provide test samples in the form of slabs or plates which were ground and polished after annealing at about 500° C.

The core glass (Ex. 1) was prepared in two mm. thick plates, while the skin glass (Ex. 2) was prepared in several thicknesses, including 0.125, 0.075 and 0.050 mm. thicknesses. These simulated possible thicknesses in projected composite products, such as ophthalmic lenses. The core glass sheets were then heat treated for three hours at 620° C. to develop the copper-cadmium-halide photochromic phase in the glass. Likewise, the skin glass samples were heat treated at 550° C. for 30 minutes and then at 620° C. for 30 minutes.

Color development in various glass sheets and sheet combinations, during a 30 minute darkening-30 minute fading cycle, was measured and recorded with a rapid scan spectrometer. In this procedure, the glass was exposed to ultraviolet radiation of about 3000 Å wavelength for 30 minutes to provide a maximum darkening, or decreased transmission, a value identified as $T_{30}$. The initial glass transmission before exposure is commonly shown as $T_o$. The darkening exposure was followed by a second 30 minute time span during which the radiation source was removed and the glass allowed to fade. The final faded transmission value then was $F_{30}$.

In addition to recording color development for the individual glasses (Examples 1 and 2), similar, continuous, rapid scan recordings were made on composites. These consisted of a 2 mm. plate of Example 1 (core) glass faced serially with a plate of Example 2 glass in each of the three thicknesses (0.125, 0.075 and 0.050 mm.).

FIG. 3 shows the scan patterns recorded for the glass of Example 1 (Curve A), the glass of Example 2 (Curve B), and the composite consisting of a 2 mm. core and a 0.125 mm. facing (Curve C). Scans were recorded for the combinations embodying the other thickness plates as well. However, these combination scans were similar in form to the one shown, but somewhat displaced in absolute values. Hence, they have been omitted in the interest of clarity.

As in FIG. 2, the solid portion of a line, starting at $T_o$, represents the exposure or darkening part of the cycle, and the dotted portion represents the fading portion. It will be appreciated that complete fading has not occurred in the time allotted.

In FIG. 3, as subsequently in FIG. 4, values for the x-color coordinate are plotted along the horizontal axis, and y-color coordinate values are plotted along the vertical axis. It is apparent that the combination provides a darkened color intermediate the two individual glasses, that is, an "averaged" color that approaches a neutral color. It is also apparent that the selection of initial glasses will permit considerable variation in the color achieved. Thus, optimization for any given purpose may be achieved once the desired color characteristics are defined.

It will be observed that the scan for the combination produces an essentially S-shaped curve in the darkening portion of the cycle. This may be explained on the basis that the skin glass dominates the effect in the initial stage of exposure. Later in the cycle, the skin and core glasses contribute on a more equal basis, and finally the core glass dominates in the later stage.

FIG. 4 is a graphical representation similar to FIG. 3. It demonstrates that the shift in color development can be achieved by use of ion exchange. Thus, the desired thin layer of skin glass can effectively be produced by ion exchange. In this procedure, silver ions are caused to migrate into a glass surface in exchange for alkali metal ions, especially lithium or sodium.

FIG. 4 shows a scan on a plate of glass having the composition of Example 1, and identified as "Base Glass". It further shows, for comparison, a scan on a similar plate after that plate had been given an ion exchange treatment (shown as "Ion Exchanged Glass").

Sample plates of the base glass were prepared as described earlier. That is to say a glass batch, based on Example 1, was mixed, melted, and poured into plate or slab molds. The slabs were then ground and polished to a two mm. thickness.

One sample plate was then immersed into a molten salt bath composed of 30% silver nitrate ($AgNO_3$) as the active ingredient and the remainder sodium nitrate. The bath was maintained at 450° C. and the plate suspended in the bath for a period of four (4) hours. This treatment produced a substantial exchange of silver for sodium ions in the glass surface to a depth of a few mils. The ion exchanged glass was then heat treated at 550° C. and 620° C. to develop a copper-cadmium-chloride photochromic phase in the original glass in the interior, and a copper-cadmium-silver-chloride phase in the ion exchanged surface glass layer.

The unexchanged base glass sample and the corresponding ion exchanged sample were then exposed to ultraviolet radiation for 30 minutes, as described above. Following this, the radiation source was removed and the glass allowed to fade for 30 minutes. The continuous scans of color development recorded for each sample are shown in FIG. 4. Also shown is a scan for the glass of Example 2, that is a glass in which a copper-cadmium-chloride photochromic phase is developed during heat treatment of the glass as melted.

We claim:

1. A composite photochromic glass article comprising a core portion and a thin surface layer substantially encasing that core portion, one of said core portion and encasing layer being composed of a first glass containing a copper-cadmium halide photochromic phase in a surface layer thereof, and the other of said component parts being composed of a second glass that has a copper-cadmium-silver halide photochromic phase developed therein, the depth of photochromic development in the article being not over about ten mils and exhibiting, in the darkened state, a color intermediate the characteristic red and green of the component glasses.

2. A composite photochromic glass article in accordance with claim 1 wherein the glass layer encasing the core portion is not over five mils in thickness.

3. A composite photochromic glass article in accordance with claim 1 wherein the thickness of the glass layer encasing the core portion is in the range of one to three mils.

4. A composite photochromic glass article in accordance with claim 1 wherein the core portion is composed of the glass containing a copper-cadmium halide photochromic phase, and the encasing layer is composed of the glass having a copper-cadmium-silver halide photochromic phase developed therein.

5. An article in accordance with claim 4 wherein the glass core portion is composed of a silicate base glass containing 0.3–10% of copper and/or cadmium and sufficient halogen, selected from chlorine, bromine and iodine, to react stoichiometrically with at least 0.3% total copper and/or cadmium.

6. An article in accordance with claim 5 wherein the selected halogen is chlorine and the photochromic phase in the core portion is copper-cadmium-chloride.

7. An article in accordance with claim 5 wherein the base glass consists essentially of 40–76% $SiO_2$, 4–26% $Al_2O_3$, 4–26% $B_2O_3$, and at least one alkali metal oxide in the indicated proportions of 2–8% $Li_2O$, 4–15% $Na_2O$, 6–20% $K_2O$, 8–25% $Rb_2O$ and 10–30% $Cs_2O$.

8. An article in accordance with claim 4 wherein the encasing surface layer is composed of a silicate glass containing a photochromic phase which includes copper, cadmium, silver and at least one halogen selected from the group consisting of chlorine, bromine, and iodine, the respective contents thereof, in weight percent as calculated from the glass batch being at least 0.01% Ag, 0.03% CuO, 0.4% CdO and 0.3% total halogen.

9. An article in accordance with claim 8 wherein the selected halogen is chlorine and the photochromic phase in the layer is copper-cadmium-silver-chloride.

10. An article in accordance with claim 8 wherein the base glass consists essentially of 40–76% $SiO_2$, 4–26% $Al_2O_3$, 4–26% $B_2O_3$, and at least one alkali metal oxide in the indicated proportions of 2–8% $Li_2O$, 4–15% $Na_2O$, 6–20% $K_2O$, 8–25% $Rb_2O$ and 10–30% $Cs_2O$.

11. An article in accordance with claim 1 wherein the glass core portion and the surface layer glass have the same composition, except that a portion of the alkali metal ion content of the surface layer has been replaced by a molecularly equivalent amount of silver ion.

12. An article in accordance with claim 1 wherein the glass article is a laminated glass sheet.

* * * * *